United States Patent [19]

Bianchi et al.

[11] Patent Number: 4,679,850
[45] Date of Patent: Jul. 14, 1987

[54] DEVICE FOR FIXING A HEADREST ON A VEHICLE SEAT STRUCTURE

[75] Inventors: François Bianchi, Valentigney; Denis Busa, Audincourt; Francois Fourrey, Montbeliard, all of France

[73] Assignee: Cycles Peugeot, Valentigney, France

[21] Appl. No.: 873,928

[22] Filed: Jun. 13, 1986

[30] Foreign Application Priority Data

Feb. 11, 1986 [FR] France ................................ 86 01845

[51] Int. Cl.[4] .............................................. A47C 1/10
[52] U.S. Cl. ...................................... 297/410; 248/408
[58] Field of Search ......................... 248/408; 297/410

[56] References Cited

U.S. PATENT DOCUMENTS 3,498,672 3/1970 Leichtl ................................ 297/410
3,512,832 5/1970 Kage ................................ 248/408 X
3,512,833 5/1970 Sugiura ............................ 248/408 X
4,577,837 3/1986 Berg et al. ...................... 248/408 X Primary Examiner—James T. McCall
Attorney, Agent, or Firm—Sughrue, Mion, Zinn, Macpeak, and Seas

[57] ABSTRACT

Two diametrically opposed orifices (4, 6) are provided in the framework tube of the backrest of the seat structure and receive the headrest support bar (1) which extends therethrough. A locking lug (10) projecting inside the tube extends into a notch in this bar and immobilizes it. The lug (10) is carried internally by a collar (12) which partly covers the tube (2) and extends round the upper orifice receiving the bar (1). A guide socket (24) is fitted into an opening (18) of the collar coaxially with the upper orifice (4).

9 Claims, 4 Drawing Figures

DEVICE FOR FIXING A HEADREST ON A VEHICLE SEAT STRUCTURE

Headrests currently mounted on backrests of vehicle seat structures comprise two support rods which can be easily introduced into sleeves fixed to the framework tube of the backrest and then immobilized in position by a pin or the like engaged, on one hand, in a slot of the sleeve and, on the other hand, in a step or notch in the corresponding rod. Such an assembly is simple, but it presupposes the local lateral deformation of the framework tube and then the precise welding of the sleeve so that its slot is in a well-determined position, which constitutes a delicate operation. Moreover, the sleeve constitutes a projection on the framework tube and can consequently be a hindrance in the absence of the headrest.

An object of the present invention is to overcome these drawbacks by providing a device for fixing a headrest which is extremely simple to construct and does not take up a great amount of space.

The invention therefore provides a device which comprises in the framework tube of the seat structure two diametrically opposed orifices for receiving a support bar of the headrest, and an aperture located between said orifices for the passage of a locking lug carried by a split collar which locally covers the framework tube and cooperates with a notch in the support bar for immobilizing the latter.

According to another feature, the split collar is formed by a portion of a cylinder of plastics material whose inside diameter is similar to the outside diameter of the framework tube and is provided with a central opening coaxial with the upper orifice of the framework tube or the orifice for introducing the support bar.

Owing to this arrangement, it is no longer necessary to deform the lateral surface of the tube or weld an additional member thereto.

Of course, the orifices of the framework tube may have any suitable shapes corresponding to those of the support bar of the headrest so that the invention can permit both the fixing of a headrest having two cylindrical support bars and a headrest which has only a single rectangular and flat bar.

The following description of one embodiment given as a non-limiting example and illustrated in the accompanying drawings will bring out the features and advantages of the invention.

Figure 1:
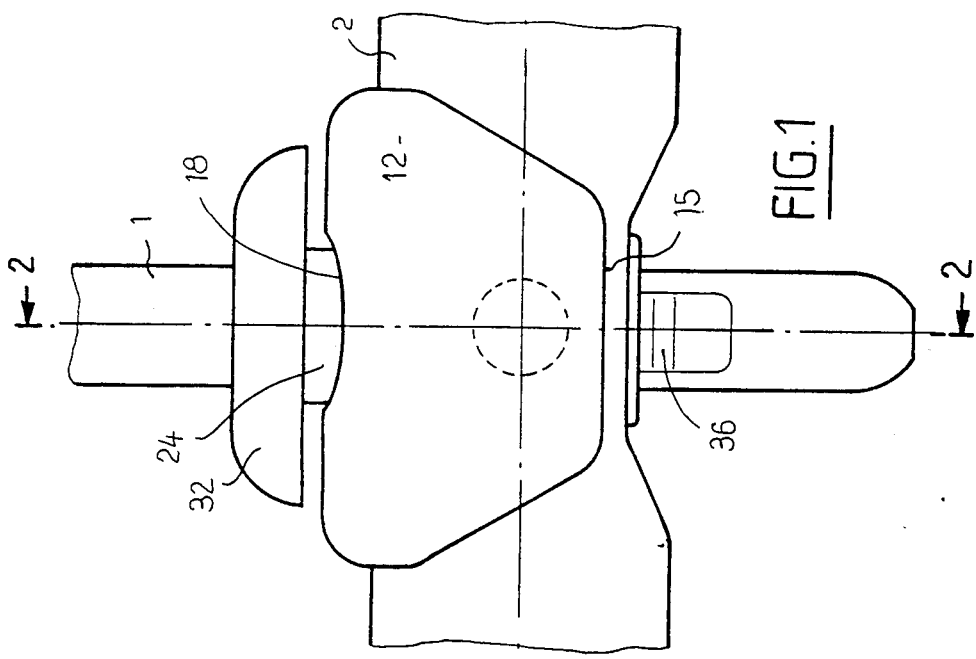
FIG. 1 is a side elevational view of a fixing device according to the invention mounted on a framework tube and having a headrest support bar extending therethrough.

The fixing device according to the invention is adapted to mount a headrest on the backrest of a seat structure, or more precisely to assemble the or a support bar 1 of this headrest on the upper tube 2 of the framework of the seat structure, as shown in FIG. 1. For this purpose, the tube 2 is provided with two diametrically opposed orifices respectively 4 and 6 (FIG. 2), each of these orifices having a shape similar to that of the cross-section of the bar or rod 1, which may thus extend through these orifices in succession. A third orifice 8 is provided in the wall of the tube 2 between the first two orifices and a lug 10, carried by the inner surface of a collar 12 locally covering the tube 2, extends through this third orifice.

The collar 12 has the shape of a portion of a cylinder whose inside diameter is substantially the same as that of the outer surface of the tube 2 and covers the greater part of this outer surface. Indeed, the longitudinal edges 14, 15 of this portion of a cylinder are located on each side of the lower orifice 6 of the tube 2, at a short distance from this orifice. In a portion facing the slot defined by these edges 14 and 15, the collar 12 has a central orifice 18 whose shape is exactly similar to that of the upper orifice 4 of the tube but has a slightly larger size. Preferably, as shown in FIG. 1, the collar 12 has a maximum axial dimension in the region of the opening 18 but this dimension progressively diminishes in the direction of the longitudinal edges 14 and 15 of the slot. Consequently, the lug 10 extends from a relatively narrow portion of this collar 12.

Figure 3:
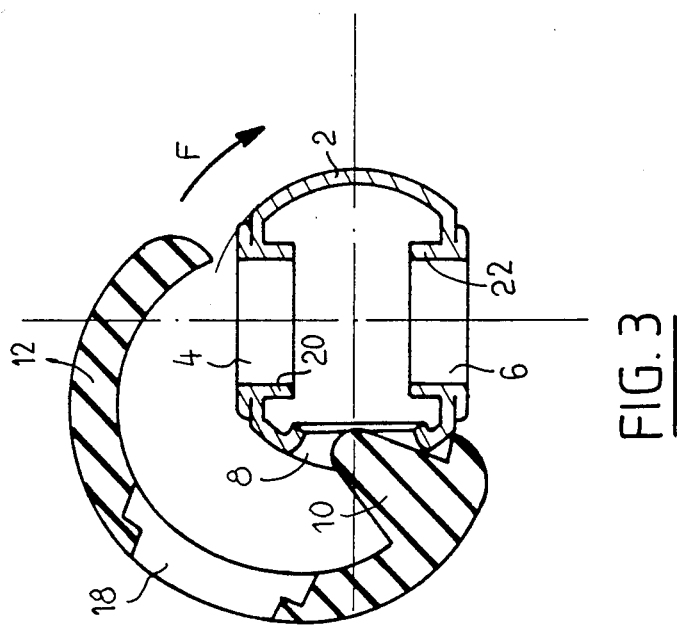

The collar 12 is placed in position on the tube 2 therefore very simply by introducing the lug 10 into the orifice 8 and then tipping the whole of the collar 12, as indicated by the arrow F in FIG. 3, until it is completely fitted onto the tube 2. As the lug 10 has centered the collar, the opening 18 places itself automatically around the orifice 4 of the tube 2 while the elasticity of the material from which the collar 12 is made combined with the shape of the latter, ensure that it grips the tube 2. Preferably, each upper orifice 4 and lower orifice 6 of the tube 2 is reinforced by a sleeve 20, 22 projecting inside this tube. This sleeve may be added and fixed, for example by welding, in the corresponding orifice, but when the support bar 1 has a cylindrical shape, it is often preferable to make this sleeve at the same time as the orifice itself by a combined piercing and forming of the tube 2.

Figure 2:
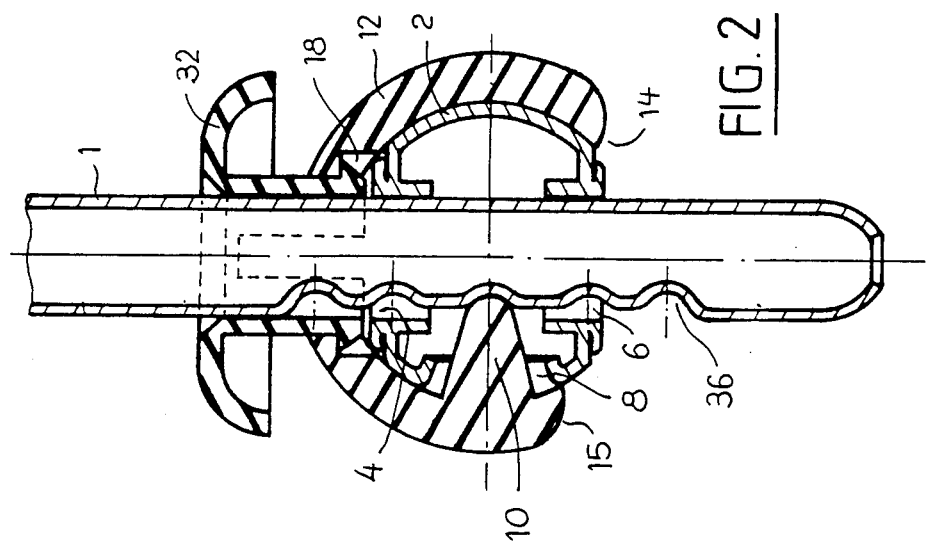
FIG. 2 is a sectional view taken on line 2—2 of FIG. 1.

It will be understood that the support bar 1 of the headrest, or each of the support bars, if the headrest is provided with a plurality of bars, has at least one locking notch or opening. Preferably, as shown in FIG. 2, the bar 1 has a succession of notches or steps 36 capable of receiving the lug 10 of the collar 12. When the headrest is placed in position, the bar 1 is indeed inserted into the orifices 4 and 6 of the tube 2 until the headrest reaches the desired height upon which the lug 10 is made to enter the corresponding notch 36. The elasticity of the collar 12 carrying the lug 10 enables the latter to be urged outwardly when the support rod 1 is displaced axially and to automatically resiliently fit into the corresponding notch so as to lock the headrest in position when this displacement ceases. Further, the force normally exerted on the headrest tends to consolidate this locking.

Figure 4:
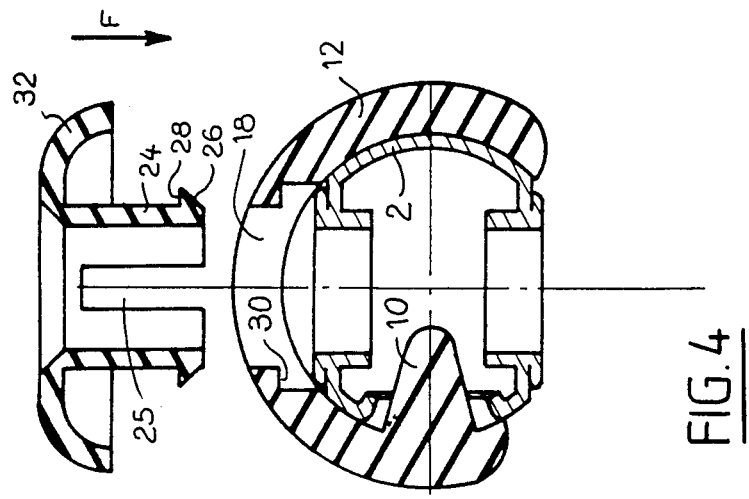
FIGS. 3 and 4 are sectional views, perpendicular to the framework tube, of the fixing device of the invention in two successive assembly stages.

According to a preferred embodiment, the device further comprises a guide socket 24 which is axially split at 25 and terminates at one end in a conical head 26 constituting an outer shoulder 28 which cooperates with an inner shoulder 30 provided in the lateral wall of the opening 18 of the collar 12 (FIG. 4). At its end opposed to the head 26, the socket 24 has a curved flange 32 whose concavity faces inwardly and clamps therebetween and the collar 12 the padding of the backrest (not shown) and thus prevents any harmful contact between the padding and the support bar 1.

The fixing is reinforced by the presence of this guide socket 24 which, in cooperating with the support bar 1 and with the opening 18, prevents any accidental tilting of the collar 12 with respect to the tube 2, i.e. any separation of the component parts of the fixing device.

There is therefore obtained a reliable assembly of the support bar or bars of a headrest on the framework 2 of the seat structure with component parts which are easy to construct, can be rapidly assembled and take up a small amount of space.

What is claimed is:

1. A device for slidingly mounting on a seat structure a headrest extended by at least one support bar having at least one notch, said device comprising a framework tube of the seat structure, the tube having a lower side portion, an upper side portion and an intermediate lateral side portion, a lower orifice and an upper orifice which are respectively provided in said lower side portion and said upper side portion of said tube for slidingly receiving said support bar, said orifices being suitable spaced apart for guidingly maintaining said support bar, in a given orientation in a transverse plane intersecting said tube, and a third orifice provided in said lateral side portion of said tube between said upper and lower orifices, a split collar engaged on and locally covering said tube and a lug resiliently carried by the split collar and extending through said third orifice for cooperation with said notch in the support bar and immobilizing said bar relative to said tube.

2. A device for fixing on a seat structure a headrest extended by at least one support bar having at least one notch, said device comprising a framework tube of the seat structure, a lower orifice and an upper orifice which are diametrically opposed and provided in said tube and receive said support bar, and a third orifice provided in said tube between said upper and lower orifices, a split collar locally covering said tube and a lug carried by the split collar and cooperative with said notch in the support bar, said tube having a circular cross-sectional shape and the collar being formed by a portion of a cylinder which has an inside diameter similar to the outside diameter of the tube and is provided with a central opening coaxial with the upper orifice for the introduction of the bar into the tube.

3. A device according to claim 1, wherein the collar has edge portions which define the split of the collar and are located on each side of the lower orifice of the tube.

4. A device according to claim 2, wherein the collar has a maximum axial dimension in the region of its central opening, said axial dimension diminishing toward the lower orifice of the tube.

5. A device for fixing on a seat structure a headrest extended by at least one support bar having at least one notch, said device comprising a framework tube of the seat structure, a lower orifice and an upper orifice which are diametrically opposed and provided in said tube and receive said support bar, and a third orifice provided in said tube between said upper and lower orifices, a split collar locally covering said tube and a lug carried by the split collar and cooperative with said notch in the support bar, each of the orifices of the tube being reinforced by a sleeve projecting inside the tube.

6. A device for fixing on a seat structure a headrest extended by at least one support bar having at least one notch, said device comprising a framework tube of the seat structure, a lower orifice and an upper orifice which are diametrically opposed and provided in said tube and receive said support bar, and a third orifice provided in said tube between said upper and lower orifices, a split collar locally covering said tube and a lug carried by the split collar and cooperative with said notch in the support bar, said device further comprising a split guide socket mounted in the extension of the diametrically opposed orifices of the tube and clipped into said opening of the collar.

7. A device according to claim 6, wherein the guide socket terminates in a flange inside the collar.

8. A device according to claim 5, wherein the support bar of the headrest has a circular cross-sectional shape and the upper and lower orifices of the tube and said sleeves are in one piece and are the result of a combined piercing and forming operation which produces the upper and lower orifices and said sleeves at the same time in said tube.

9. A device according to claim 1, wherein said collar and said tube are in one piece composed of a resilient plastics material.

* * * * *